US009215421B2

(12) United States Patent
Campagna et al.

(10) Patent No.: US 9,215,421 B2
(45) Date of Patent: Dec. 15, 2015

(54) OPEN CABLE APPLICATION PLATFORM (OCAP) AND SET-TOP BOX (STB)-BASED BILL NOTIFICATION AND PAYMENT APPLICATION

(75) Inventors: Theresa Campagna, Philadelphia, PA (US); David L. Chavez, Broomfield, CO (US); Gregory D. Weber, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 792 days.

(21) Appl. No.: 12/130,611

(22) Filed: May 30, 2008

(65) Prior Publication Data
US 2009/0300668 A1 Dec. 3, 2009

(51) Int. Cl.
| | |
|---|---|
| H04N 7/173 | (2011.01) |
| H04N 21/475 | (2011.01) |
| H04N 21/478 | (2011.01) |
| G06Q 30/02 | (2012.01) |
| H04N 21/61 | (2011.01) |
| H04N 21/81 | (2011.01) |

(52) U.S. Cl.
CPC .......... *H04N 7/17318* (2013.01); *G06Q 30/02* (2013.01); *H04N 21/4751* (2013.01); *H04N 21/47805* (2013.01); *H04N 21/6118* (2013.01); *H04N 21/6168* (2013.01); *H04N 21/8173* (2013.01)

(58) Field of Classification Search
CPC ............... H04N 21/47805; H04N 7/17318; H04N 21/254; H04N 21/2543; H04N 21/25808; H04N 21/4185; H04N 7/165; H04N 21/4751; H04N 21/4753; G06Q 30/02; G06Q 30/04; G06Q 30/00; G06Q 20/102; G06Q 20/10; G06Q 20/38; G06Q 40/00; G06Q 40/12

USPC ............... 725/1, 34–35.46; 705/14.57, 14.66, 705/14.73, 35, 40; 709/227–229
See application file for complete search history.

(56) References Cited

U.S. PATENT DOCUMENTS

| | | | |
|---|---|---|---|
| 5,920,848 | A | 7/1999 | Schutzer et al. |
| 6,049,786 | A | 4/2000 | Smorodinsky |

(Continued)

FOREIGN PATENT DOCUMENTS

| | | |
|---|---|---|
| EP | 0982954 | 3/2000 |
| EP | 1162840 | 12/2001 |

(Continued)

OTHER PUBLICATIONS

U.S. Appl. No. 12/050,575, filed Mar. 18, 2008, Campagna, et al.

(Continued)

*Primary Examiner* — Hai V Tran
(74) *Attorney, Agent, or Firm* — Sheridan Ross P.C.

(57) ABSTRACT

One exemplary aspect is advanced multimedia communications via OCAP using customer specific profiles resident in the STB for bill management. Aspects of the invention also relate to managing payment preferences, auto payment of bills or invoices, managing bill notification preferences, triggering a notification to be sent to one or more of an associated device and the STB upon receipt of a bill, analyzing an incoming bill with an intelligent agent and optionally initiating a communication to the vendor associated with a bill based on the analysis, acquiring additional information about the bill including an image of the bill and/or additional details, and forwarding invoice information to a destination associated with the STB.

20 Claims, 7 Drawing Sheets

(56) References Cited

U.S. PATENT DOCUMENTS

| | | | |
|---|---|---|---|
| 6,397,387 B1 | 5/2002 | Rosin et al. | |
| 6,564,261 B1 | 5/2003 | Gudjonsson et al. | |
| 6,637,029 B1 | 10/2003 | Maissel et al. | |
| 7,075,919 B1 | 7/2006 | Wendt et al. | |
| 7,181,689 B2 | 2/2007 | Mock et al. | |
| 7,237,251 B1 | 6/2007 | Oz et al. | |
| 7,305,697 B2 | 12/2007 | Alao et al. | |
| 7,522,579 B1 | 4/2009 | Mangal et al. | |
| 7,610,390 B2 * | 10/2009 | Yared et al. | 709/229 |
| 2002/0056109 A1 * | 5/2002 | Tomsen | 725/60 |
| 2002/0073421 A1 | 6/2002 | Levitan et al. | |
| 2002/0087968 A1 | 7/2002 | Krishnan et al. | |
| 2003/0005462 A1 | 1/2003 | Broadus et al. | |
| 2003/0048380 A1 | 3/2003 | Tamura | |
| 2003/0086694 A1 | 5/2003 | Davidsson | |
| 2004/0006627 A1 | 1/2004 | Sarfaty et al. | |
| 2004/0048380 A1 | 3/2004 | Saggio et al. | |
| 2004/0073915 A1 | 4/2004 | Dureau | |
| 2004/0117831 A1 | 6/2004 | Ellis et al. | |
| 2005/0050160 A1 | 3/2005 | Upendran et al. | |
| 2005/0233743 A1 | 10/2005 | Karaoguz et al. | |
| 2005/0235319 A1 | 10/2005 | Carpenter et al. | |
| 2005/0283800 A1 | 12/2005 | Ellis et al. | |
| 2006/0020950 A1 | 1/2006 | Ladd et al. | |
| 2006/0143119 A1 | 6/2006 | Krueger et al. | |
| 2006/0218226 A1 | 9/2006 | Johnson et al. | |
| 2007/0101413 A1 | 5/2007 | Vishik et al. | |
| 2007/0107017 A1 | 5/2007 | Angel et al. | |
| 2007/0122108 A1 | 5/2007 | Bontempi | |
| 2007/0186231 A1 | 8/2007 | Haeuser et al. | |
| 2007/0198738 A1 | 8/2007 | Angiolillo et al. | |
| 2007/0223523 A1 | 9/2007 | Montpetit et al. | |
| 2007/0240230 A1 | 10/2007 | O'Connell et al. | |
| 2007/0250864 A1 | 10/2007 | Diaz Perez | |
| 2008/0010584 A1 | 1/2008 | Corsetti et al. | |
| 2008/0046311 A1 | 2/2008 | Shahine et al. | |
| 2008/0288996 A1 | 11/2008 | Walter et al. | |

FOREIGN PATENT DOCUMENTS

| | | |
|---|---|---|
| JP | 2003-331205 | 11/2003 |
| JP | 2004-013611 | 1/2004 |
| JP | 2005-148780 | 6/2005 |
| WO | WO 00/05889 | 2/2000 |
| WO | WO 00/49801 | 8/2000 |
| WO | WO 01/17250 | 3/2001 |
| WO | WO 01/43424 | 6/2001 |
| WO | WO 02/069627 | 9/2002 |
| WO | WO 03/088655 | 10/2003 |
| WO | WO 2005/125203 | 12/2005 |

OTHER PUBLICATIONS

U.S. Appl. No. 12/050,605, filed Mar. 18, 2008, Campagna, et al.
U.S. Appl. No. 12/050,634, filed Mar. 18, 2008, Campagna, et al.
U.S. Appl. No. 12/050,677, filed Mar. 18, 2008, Campagna, et al.
U.S. Appl. No. 12/130,642, filed May 30, 2008, Campagna, et al.
U.S. Appl. No. 12/134,738, filed Jun. 6, 2008, Chavez, et al.
U.S. Appl. No. 12/210,628, filed Sep. 15, 2008, Campagna, et al.
"Open Cable Application Platform Specifications (OCAP) 1.1", Cable Television Laboratories, Inc., dated Dec. 29, 2006, pp. 1-636, available at http://opencable.com/ocap.
Miller, et al., "FashionMe: The Future of Fashion Shopping over the Internet", available at http://www.fashionme.iao.fraunhofer.de/Fashionme.pdf, Sep. 2000, pp. 1-6.
Background of the Invention for above-captioned application (previously provided).
"Delivering True Triple Play—Composite Applications and the Role of SIP," Alcatel, retrieved from Internet at http://www.alcatel-lucent.com/tripleplay, retrieved Feb. 6, 2007, 6 pages.
Official Communication for European Application No. 08019310, dated Jun. 29, 2010.
European Search Report for European Application No. 08019310, completed Sep. 22, 2009.
Official Action with English translation for Japan Patent Application No. 2009-128372, mailed Aug. 9, 2012 5 pages.
Official Action with English translation for China Patent Application No. 200810182185.7, dated Aug. 28, 2012 13 pages.
Notice of Allowance with English Summary for China Patent Application No. 200810182185.7, dated Mar. 4, 2014 3 pages.
Official Action with English Summary for Korea Patent Applciation No. 2008-0134122, dated Mar. 17, 2014 6 pages.
Notice of Allowance with English Summary for Korea Patent Application No. 2008-0134122, dated May. 22, 2014 3 pages.
Official Action (with English translation) for China Patent Application No. 200810182185.7, dated Mar. 14, 2013, 16 pages.
Official Action with English Translation for Japan Patent Application No. 2009-128372, dated Jul. 25, 2013 6 pages.
Official Action with English Translation for Korea Patent Application No. 2008-0134122, dated Aug. 30, 2013 9 pages.

* cited by examiner

Payees

1. Electric Company
2. Mortgage
3. Gas Company
4. Insurance Company
. . .

Payee Preferences

Electric Company
P.O. Box 132
Anytown, US
Acct. No.: 123456

Edit

Use Bank 1
Account 1
Pay on 10$^{th}$ of Month

Save

Notification Preferences

On Receipt of Bill:

Send Payee Name and Amount to Phone No.: 123.456.7890

Edit

Populate Received Bill Interface

Automatically Pay if Amount Below $200

Save

Update Status to "Paid" on 10th

Fig. 5

OPEN CABLE APPLICATION PLATFORM (OCAP) AND SET-TOP BOX (STB)-BASED BILL NOTIFICATION AND PAYMENT APPLICATION

CROSS-REFERENCE TO RELATED APPLICATIONS

Cross reference is made to:

U.S. patent application Ser. No. 12/050,575, filed Mar. 18, 2008, entitled "OPEN CABLE APPLICATION PLATFORM SET-TOP BOX (STB) PERSONAL PROFILES AND COMMUNICATIONS APPLICATIONS;"

U.S. patent application Ser. No. 12/050,605, filed Mar. 18, 2008, entitled "OPEN CABLE APPLICATION PLATFORM SET-TOP BOX (STB) PERSONAL PROFILES AND COMMUNICATIONS APPLICATIONS;"

U.S. patent application Ser. No. 12/050,634, filed Mar. 18, 2008, entitled "OPEN CABLE APPLICATION PLATFORM SET-TOP BOX (STB) PERSONAL PROFILES AND COMMUNICATIONS APPLICATIONS;" and U.S. patent application Ser. No. 12/050,677, filed Mar. 18, 2008, entitled "OPEN CABLE APPLICATION PLATFORM SET-TOP BOX (STB) PERSONAL PROFILES AND COMMUNICATIONS APPLICATIONS," all of which are incorporated herein by reference in their entirety.

FIELD OF THE INVENTION

This invention relates generally to set-top boxes and more particularly to one or more profiles associated with a set-top box. Additional aspects of the invention relate to the interoperability of STBs, one or more profiles, and one or more applications associated with an open cable application platform enabling bill payment and notification.

BACKGROUND

The OpenCable™ Platform specification can be found at http://www.opencable.com/ocap/, "OpenCable Application Platform Specification (OCAP) 1.1," which is incorporated herein by reference in its entirety.

OCAP is an operating system layer designed for consumer electronics, such as STBs, that connect to a cable television system. Generally, the cable company controls what OCAP programs can be run on the STB. OCAP programs can be used for interactive services such as eCommerce, online banking, program guides and digital video recording. Cable companies have required OCAP as part of the CableCard 2.0 specification, and they indicate that two way communications by third party devices on their networks will require them to support OCAP.

More specifically, OCAP is a Java® language-based software/middleware portion of the OpenCable initiative. OCAP is based on the Globally Executable MHP (GEM)-standard, as defined by CableLabs. Because OCAP is based on GEM, OCAP shares many similarities with the Multimedia Home Platform (MHP) standard defined by the Digital Video Broadcasting (DVB)-project. The MHP was developed by the DVB Project as the world's first open standard for interactive television. It is a Java (language-based environment which defines a generic interface between interactive digital applications and the terminals on which those applications execute. MHP was designed to run on DVB platforms but there was a demand to extend the interoperability it offers to other digital television platforms. This demand gave rise to GEM, or Globally Executable MHP, a framework which allows other organizations to define specifications based on MHP.

One such specification is OCAP which has been adopted by the US cable industry. In OCAP the various DVB technologies and specifications that are not used in the US cable environment are removed and replaced by their functional equivalents, as specified in GEM. On the terrestrial broadcast side, CableLabs and the Advanced Television Systems Committee (ATSC) have worked together to define a common GEM-based specification, Advanced Communications Application Platform (ACAP), which will ensure maximum compatibility between cable and over-the-air broadcast receivers.

SUMMARY OF THE INVENTION

These technologies provide the platform for a greatly enhanced, multimedia-enabled, customer communication experience. Specifically, one exemplary aspect of this invention is advanced multimedia communications via OCAP using customer specific profiles resident in the STB for bill or invoice management. Telephony application servers have already been proposed by CableLabs and others. Phone, e.g., cell phone, soft phone, etc, and STB association can be done in the Multi-Service Operator (MSO) network.

However, an exemplary aspect of this invention utilizes storage of personalized information and communication preferences in the STB in a structured format or via cookies. The combination of feature rich telephony applications with the personalized data stored in a STB facilitates a feature rich communications session. Providing advanced multimedia communications applications using personalized data resident in STBs could allow MSOs to provide, for example, many previously unavailable services.

The types of personal information that can be stored in STBs may include, but are not limited to, communication preferences, bill or invoice management preferences, bill or invoice payment preferences, rules governing payment, etc, personal information, etc. Examples of communications preferences could include type and format of bills, secure or open communications, encryption preferences, and in general any information related to bill management or payment or communications. Examples of personal information could include bank information, payment preferences, intelligent agent monitoring of one or more accounts, account information, or in general any information related to personal information. Other such personal information categories and variations stored in STBs as can be imagined by one schooled in this art are also within the scope of this invention disclosure.

Screen menus, pushed URLs, and adaptations specific to various devices connected to STBs (such as different size screens, different capability devices, etc.) can be rendered as part of this process of enhanced communications. Similarly, contextual favorites or preferences can be provided depending on what content is being displayed or interacted with.

When one combines the integration of a profile, such as personal information in STBs, with applications resident in a variety of places on the MSO's network, these new value added services are enabled.

A few simple examples of what is possible could include, but are not limited to, enhanced web enabled service transactions, e.g., bill pay, bill reminders, auto payment, intelligent agent analysis of incoming bills, and the like, mobile requests for bill payment, etc.

For example, the user can initiate a bill payment transaction on the STB itself. The exemplary menu based request will use the stored account and vendor information to key a web service request. If the request should trigger a human response (like communication with a vendor to discuss a specific charge), then the STB information can key to the customer phone for an outbound call to coordinate a call with a customer service agent.

The exemplary embodiments discussed herein just hint at the power of the proposed enhancement to this new communications paradigm. There are many other potential examples and applications to serve them that are possible.

For example, it is generally recognized that an intelligent agent is a software agent that assists users and will act on their behalf in performing non-repetitive computer-related tasks. An agent in this sense of the word is like an insurance agent or a travel agent. While the working of software agents used for operator assistance or data mining (sometimes referred to as bots) is often based on fixed pre-programmed rules, "intelligent" in this context is often taken to imply the ability to adapt and learn. The term "personal" indicates that a particular intelligent agent is acting on behalf of an individual or a small collective group of users such as a household, business entity, etc.

OCAP provides another venue for an intelligent personal agent but offers several advantages compared with previous attempts at this type of application. One is the fact that STBs are already equipped to handle two-way, full-motion, High Definition (HD) video, as well as any other communication media. Another advantage is the integration of the personal profile information with an intelligent personal agent application. Another is the improved security discussed herein. The extensibility and the interoperability that the Session Initiation Protocol (SIP) adds to Packet Cable 2.0 allows the full gamut of communications modalities and devices to be leveraged.

Another exemplary aspect of the invention is the use of personalized information and personal preferences contained in a STB in combination with an intelligent personal agent application and improved security to provide, for example, a greatly enhanced user experience.

The fact that sensitive information about the user can be stored within their own STB reduces security concerns associated with having too much web presence. The disclosure or query of the personal information can be established on a trust basis which also helps with security and privacy. The push of security information such as DCAS makes the environment significantly safer. One could also envision if there are multiple users within one household, that they can each have a profile that is login protected for personal privacy. Parents would be able to set certain conditions/limits for children using the intelligent personal agent application that would also add to the safety and age appropriate use of the application.

The two-way, full-motion, HD capable video without many of the quality issues associated with the Internet is a significant enhancement to current intelligent personal agents. It could provide an opportunity for video messages, such as an invitation recorded with a camera associated with the STB, to be personalized.

The personal information stored in the STB can convey many exemplary benefits such as communication preferences, alternate contact modalities, priority preferences, trusted contacts, personal information, as well as multimedia messaging, etc. The integration of the personal information with the intelligent personal agent also enhances the user experience.

There are several examples of what this idea can provide the user that current intelligent agents are not able to do. One is the ability to greet calling parties, for example, who are calling to extend an invitation, with a full-motion video greeting unique to that calling party. Another is the ability to handle more complicated transactions.

Aspects of the invention thus relate to one or more profiles on a STB.

Aspects of the invention also relate to utilization of the one or more profiles in conjunction with a bill payment application.

Still further aspects of the invention relate to providing a bill payment interface on an OCAP.

Aspects of the invention also relate to managing payment preferences.

Still further aspects of the invention relate to auto payment of bills or invoices.

Aspects also relate to managing notification preferences.

Still further aspects relate to triggering a notification to be sent to one or more of an associated device and the STB upon receipt of a bill(s).

Aspects also relate to analyzing an incoming bill with an intelligent agent and optionally initiating a communication to the vendor associated with a bill based on the analysis.

Aspects still further relate to acquiring additional information about the bill including an image of the bill and/or additional details.

Additional aspects relate to forwarding invoice information to a destination associated with the STB.

Further aspects relate to categorizing received bills based on one or more of amount, due date, type of service, e.g., utility, mortgage, fuel, etc.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 5 illustrates an exemplary payment interface according to this invention;

DETAILED DESCRIPTION

Figure 1:
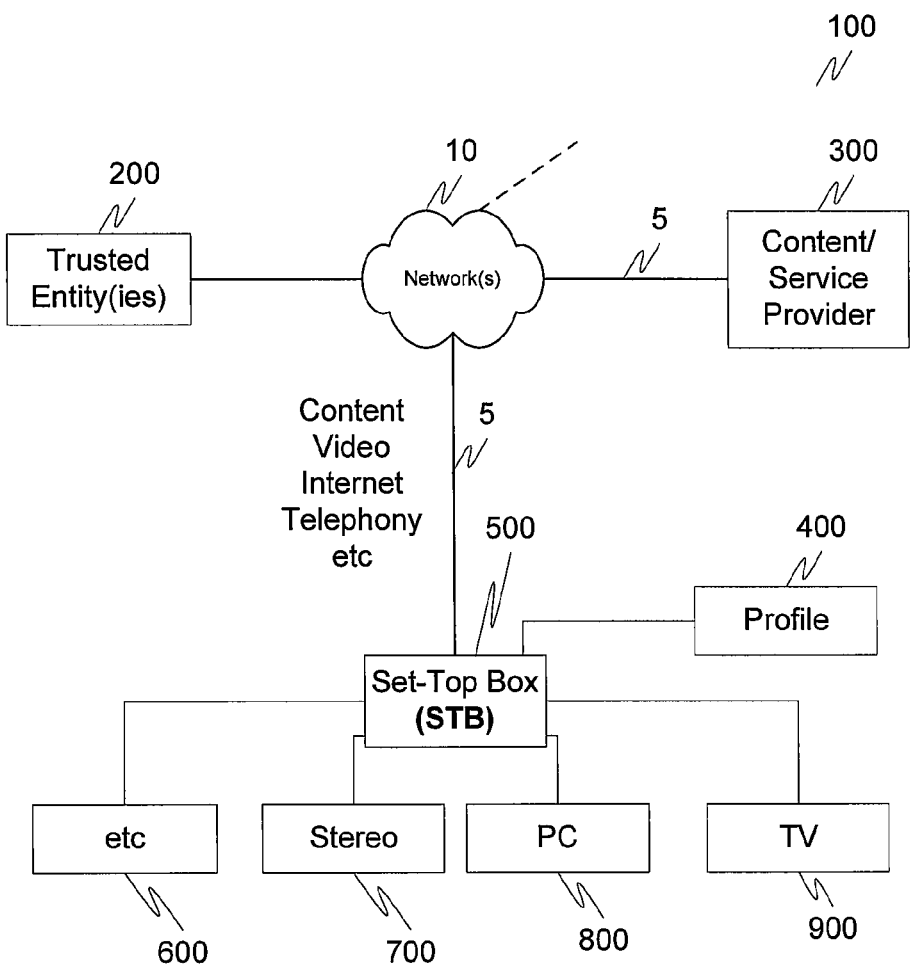
FIG. 1 illustrates an exemplary content system according to this invention.

FIG. 1 illustrates an exemplary content system 100. This system 100 comprises one or more trusted entities 200, one or more content/service providers 300, such as a cable company, and a set-top box 500 all inter-connected by one or more links 5 and networks 10. The set-top box 500 is connected to one or more of a stereo 700, PC 800, TV 900, or in general any electronic device as represented by element 600. Associated with the set-top box 500 are one or more profiles 400, as will be discussed in detail hereinafter.

The set-top box 500 can also be associated with one or more communication devices, such as a cell phone, soft phone, SIP enabled communication device, PDA, mobile communications device, or the like.

In general, the set-top box 500 is capable of receiving content, such as video content, as well as providing services such as access to the internet, telephony service, and the like. As will be discussed, the set-top box is also capable of providing services such that, for example, a user located at one of the attached devices utilizes a set-top box 500 to assist with the management of one or more items.

Typically, the content/service provider 300 provides content, such as video content, to a user via the set-top box 500, and ultimately to, for example, the PC 800 or TV 900. An exemplary embodiment of the present invention expands on this concept and in conjunction with the profile 400, provides enhanced content capabilities through the set-top box 500.

Furthermore, and in accordance with an optional exemplary embodiment, trusted relationships can be established between a content/service provider 300 and/or one or more trusted entities 200. For example, the content/service provider 300, such as a cable company, can negotiate trusted relationships with various entities. These relationships can be based on a request from a user associated with a set-top box. For example, the user can select one or more companies, such as a utility company or other entity with which set-top box owner has an account. Once an entity is designated as trusted, various service requests and interactions with the set-top box 500 and the trusted entity can be handled in a manner different than entities that are not designated as trusted.

The association of the profile 400 with a set-top box 500 allows, for example, a richer communications environment to be provided to a user. For example, account information associated with a particular vendor can be entered in the set-top box. A user can then notify the vendor of the association with the STB and request the vendor forward all communication and/or invoices regarding the account with the vendor to the STB in a specific format.

Therefore, if the account holder has a question about, for example, a bill, instead of a call to question the bill being re-routed from center to center based on the information the customer inputs via the phone, the call can use a common customer routing center. The routing center, which could be one of the trusted entities 200, can use the phone number to look up a key set-top box entry for the customer, for example, an account and/or bill number, and the center can then electronically retrieve the stored service information entry via the set-top box 500 from the profile 400. Information retrieved from the profile 400 can be combined with the caller's requested service, and forwarded to the appropriate vendor with the information retrieved from the customer set-top box, relieving a need to interrogate other databases or the user and making for more efficient contact centers. Additional information for the customer can be displayed on, for example, the TV 900, PC 800 or the like associated with the set-top box 500.

In another example, the customer can initiate an automatic bill payment schedule, such as a reoccurring bill payment, on the set-top box itself. For example, a menu-based request can use stored information in the profile 400 to key a web service request. If the request triggers a human response, like the coordination of a vendor, the set-top box information can key to the customer phone for an outbound call or multi-media communication session with the one or more other parties to get an account established and preferences for billing, etc.

Therefore, in accordance with one exemplary embodiment, the profile 400 can be used, for example, to assist with managing bills and can be utilized in conjunction with the set-top box and related equipment to provide payment scheduling, bill payment, invoice management and similar services related to bill and/or cost and/or budget service for the set-top box holder. The set-top box can also utilize intelligent agent capabilities to help manage, reschedule, and remind the set-top box holder (or one or more parties associated with the set-top box) of one or more bills.

For example, the same mechanisms can be used to push structured information and menu information for bill to provide a richer customer service experience. For example, the bill can be associated with one or more of an audio, video, or multi-media message that, for example, contains supplemental information about the bill or nature of the charges. Advertisements could also be associated with this bill and pushed to the STB. Upon review of the bill, an advertisement, such as a targeted advertisement, coupon, discount code, etc, couple be provided to the user associated with the STB. This richer experience combined with the ease of retrieval of information associated with the bill provides a significantly richer customer experience than that which can be offered by traditional billing techniques.

In accordance with an exemplary embodiment, the profile 400 used in conjunction with one or more applications resident on the set-top box provides a richer experience for the user of the set-top box for interacting with one or more other individuals, content or service providers, trusted entities, or other entities, or in general any entity that may be able to provide a richer customer experience based on the information available to them via the profile 400.

Figure 2:
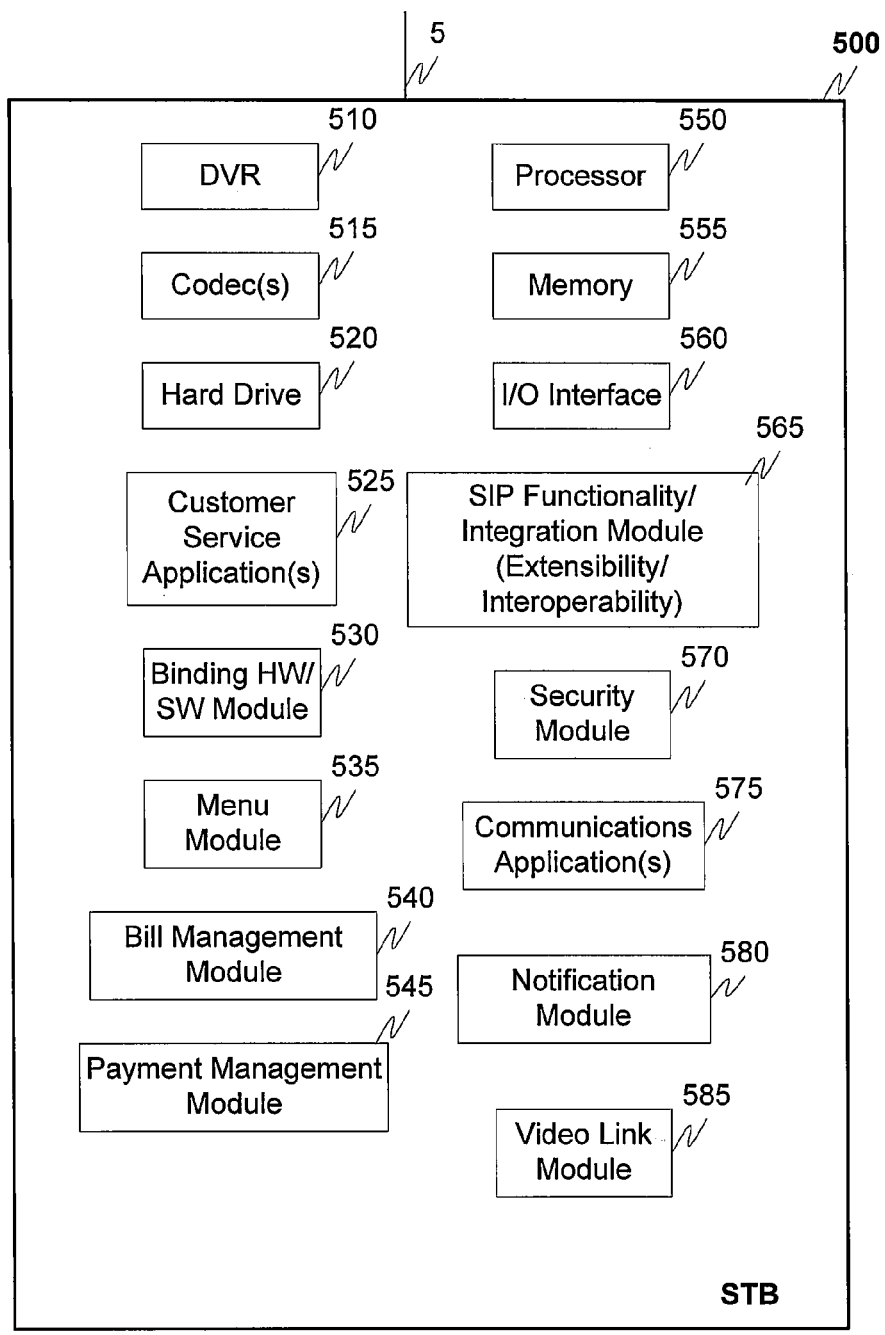
FIG. 2 illustrates an exemplary set-top box according to this invention.

FIG. 2 illustrates in greater detail an exemplary set-top box 500. The exemplary set-top box 500 includes one or more of a DVR 510, codec(s) 515, hard drive 520, one or more customer service applications 525, a binding hardware/software module 530, a menu module 535, a bill management module 540, a payment management module 545, a processor 550, a memory 555, an I/O interface 560, a SIP functionality/integration module 565, a security module 570, one or more communications applications 575, a notification module 580 and a video link module 585.

The DVR 510 can be used to store video information, as is conventionally known, and can also be used as a storage device for one or more applications on the set-top box. For example, the DVR 510 can be used for a back-up for non-active applications, or active applications can be run on, for example, the hard drive 520 in conjunction with one or more of the processor 550, memory 555, and I/O interface 560.

The set-top box can also include one or more codecs 515 that provide, for example, one or more of coding and decoding of video information, audio information, HD video information, multi-media information or in general any audio or video format received by or sent from a set-top box 500.

The set-top box 500 also includes one or more customer service applications 525. These customer service applications can cooperate with information in the profile 400 to provide various functionalities to a user at one or more of the TV 900, PC 800, stereo 700, or in general any device 600 associated with the set-top box 500. As discussed, these customer service applications can include, but are not limited to, profile management applications, bill management applications, bill payment scheduling applications, or in general any application that is capable of operating on or in conjunction with the set-top box 500. As will be appreciated, the application need not run exclusively on the set-top box 500, but could operate in conjunction with one or more applications on, for example, a connected electronic device, such as PC 800.

The hardware/software binding module 530 allows the set-top box 500 to be associated with one or more other electronic devices, such as a telephone, soft phone, or in general any device that is capable of being bound to the set-top box 500. For example, if a user activates a customer service application on the set-top box 500 to schedule a payment with a trusted entity 200, upon the intelligent agent module (discussed below) determining that a schedule payment request has been initiated, the intelligent agent module can request the hardware/software binding module to initiate a communication to the user to determine an appropriate action to take, e.g., pay the full amount, pay a partial amount, etc.

This binding can be done, for example, with the cooperation of the SIP functionality/integration module 565, in that SIP provides a convenient mechanism to establish, teardown, or redirect communications. More specifically, stored within the profile can be information specifying communication device information associated with the user of the set-top box.

SIP protocols can be initiated from the set-top box to the phone associated with the user to, for example, confirm a payment, place a call to an agent to assist with scheduling payment, or the like. A message indicating that a communication has been initiated can also optionally then be displayed on one or more of the phone and a device associated with STB 500. It should be appreciated that this communication can be in many different formats including an electronic message, a text message, a voice message, or in general any format capable forwarding payment information.

The menu module 535 provides an interface, such as a graphical user interface, which can be displayed on one or more of the TV 900, PC 800, or in general any display device that allows manipulation of, for example, one or more of the features of the set-top box 500 and one or more profiles. For example, a user could utilize the menu module 535 to edit one or more profiles 400 stored on the set-top box. Additionally, the menu module 535 can be used in conjunction with various applications residing on the set-top box to provide necessary menus to the user associated with a particular bill management application or functionality. For example, the menu module 535 can provide the various interfaces that allow a user to interact with bill management functionality and can also cooperate with one or more of the trusted entities and content/service providers to provide menus to a user of the set-top box 500 in conjunction with one or more functions described herein.

Many consumers take advantage of bill pay or other Internet-based payment services. However, an even greater amount of consumers do not. Typical reasons for lack of this adoption are varied, but a large number of people simply find the personal computer based interface too complex, unintuitive, insecure and/or impersonal. One exemplary aspect of the bill management module 540 provides the ability to notify the consumer of pending bills that they can electronically pay from their OCAP-based client using credit cards, or various banking products such as a checking account, savings account, debit card, or the like. The consumer would optionally be able to see the invoice, would be able to access personal preferences and account information to effect payment and would be given the option of interacting with a live agent or teller via a real-time, full-motion video for additional information or help when necessary. This could be especially useful in providing a teller or customer service experience that is far more attractive for bank interactions rather than typical web-based bill paying experiences.

Thus, in accordance with one exemplary embodiment, the bill management module 540 provides the use of personalized information and personal preferences contained in a STB profile combined with bill notification and payment applications, which may include improved security and the ability to request a real-time, full-motion video link to one or more of a teller and customer service agent.

The bill management module 540 provides various functionalities associated with the receipt, management and payment of one or more bills in cooperation with the payment management module 545 and the notification module 580. In general, a user first needs to communicate with one or more entities, such as a vendor, and provide an indication that they would like to receive bills, notices, advertisements, or in general any communication, from that vendor at their STB. This association can be done proactively under the instruction of a user or, for example, could happen automatically or semi-automatically. For example, when a user receives a paper-based bill, the user could setup the vendor in the STB. This could trigger an automatic interaction with the vendor thereby associating the STB with the vendor and confirming the vendor is to forward all communications for this particular client to the STB. Alternatively, the user could forward an email containing an invoice or bill to the STB and the STB's intelligent agent could analyze the incoming bill, populate the necessary information in the vendor information 440 thereby allowing bill payment and management from the STB. A vendor could also provide this functionality as a service such that when the user creates an account with a vendor, the vendor can communicate with the STB and the association completed.

Once an association between one or more vendors and the STB is accomplished, bills can be received by the STB. Other methods of making this association are possible and in gereran any method of associating a STB with a vendor will work.

When a bill is received by the STB, the bill management module 540 analyzes the incoming bill. This analysis can include identifying the amount due, minimum payment information, due date information, account number information, invoice number, or in general any information associated with the received bill. Based on this analysis, and the application of one or more rules, a pre-determined action can be optionally performed. For example, and depending on the analysis, one or more of automatic payment of the bill can be initiated, forwarding of the bill information to one or more destinations, ranking the invoice by due date and/or amount, an image of the bill can be secured, payment history information can be obtained, and the bill categorized into one or more different categories based on, for example, whether it's a utility bill, car payment, mortgage payment, or in general any category which could be pre-defined or selected by a user.

Therefore, based on the analysis of the bill, the user can set up one or more rules that trigger one of these predetermined actions if the criteria for enacting the rule(s) are met. This analysis can be performed on each new bill and optionally only apply to specific bills as selected by a user or, for example, apply to specific bills based on the analysis upon arrival. Alternatively, or in addition, the bill can simply be listed with one or more other bills provide on an interface generated by the STB 500. Examples of these interfaces will be discussed hereinafter in relation to FIGS. 4 and 5.

Upon completion of a payment or a payment action, the payment management module 545 can store information about the payment or action, such as amount paid, payment date, transaction identification, or in general any information related to the payment. In addition, the payment management module 545 can change the status of a received bill from "incoming" to "paid."

The bill management module 540, in cooperation with the STB 500, also allows the user to associate one or more communications devices or other electronic devices with the STB. Therefore, upon receipt of an incoming bill, a user could initiate a transaction to one or more of a service provider, personal agent, intelligent agent, or interactive voice response system. Therefore, for example, upon receiving a bill that appears to be of concern, and in conjunction with the notification module 580, a communication can be sent to one or more of the associated communications devices if an indicator, such as a flag, that there appears to be an issue with the incoming bill. Upon receipt of this bill with the communications device, a communication could be initiated, via, for example, SIP protocols, to a service provider. The service provider could provide the necessary protocols to recognize the communications device in associated STB, and based on the invoice information, automatically connect the user of the associated communications device with, for example, a customer service agent who associated with the vendor of the received invoice.

An intelligent agent could be used to assist with determining whether a bill should be flagged. For example, a bill could be reviewed and compared to previous bills from the same vendor and a determination whether the charge appears to be abnormal. Checks could also be made to ensure last payment information corresponds to the "Last Payment Received" information on the bill, and the like. In general, any criteria on the bill could be evaluated and compared with one or more of historical information, metrics, rules, or the like to assist with determining whether a bill is abnormal. If abnormal, as discussed, a flag or other identifier (audio, video, graphical or multimedia-based) could be associated with the bill.

Upon receiving notification that a bill has been received at one or more of the communications device and STB, a user can select a bill for payment, optionally applying preferences and rules as discussed previously. Upon selection of a bill for payment, a query can be generated asking the user whether a contact to the payee should be initiated. If a contact to the payee should be initiated, one or more of a phone communication, video conference and multi-media session with a payee agent can be initiated. The communication session is then conducted with the optional feature of collaborating with an agent to one or more of pay a bill, modify a bill, question a bill, or manage the bill process.

Upon selection of a bill for payment, payment options can also be selected by a user that allow one or more of the selection of account information, payment amount information, payment date information, or in general any selectable item relating to the management and/or payment of the bill. Upon the necessary payment options being selected, transaction information, payment information, and payee information can be forwarded to the payee and the transaction information stored with the payment management module 545 optionally updating the status of the bill to paid, partially paid, or in general any appropriate status identifier.

The notification module 545 allows one or more various types of notifications to be sent to one or more of the STB and associated communications device or other electronic device. In particular, upon receipt of a bill, and optionally based on one or more rules in an analysis of the bill, various types of notifications could be provided to various destinations. In a simple exemplary embodiment, a notification can be displayed on the interface generated by the STB that would show a user a new bill has arrived when they turn on, for example, the TV associated with the STB. In another embodiment, notification including various information about the received bill can be sent to one or more of the associated devices with the option of customizing this notification based on rules and an analysis of the incoming bill. For example, a user could request that all invoices over a certain amount, or due within a certain time period, be forwarded to an associated communications device, while invoices that have a longer payment period simply reside on the STB.

The notification module 580 can also provide information to one or more of the STB and an associated communications or electronic device such as when a payment was completed, a message from an associated vendor, an advertisement, or in general any information associated with one or more vendors.

The set-top box environment also provides the ability to utilize two-way, full-motion video, in addition to the HD video, while it does not suffer from the drawbacks associated with typical internet-based applications, such as latency, dropped frames, and the like. Various calendaring modules are thus capable of providing interaction with one or more other participants for example based on an invitation, which is more like a face-to-face interaction.

The SIP functionality/integration module 565 allows one or more SIP-based communications to be used in conjunction with the set-top box 500 and profile 400. These SIP-based communications could be run in parallel with various applications run on the set-top box 500 and, as discussed, can be bound to one or more other devices, such as a telephone, PDA, home phone, business phone, or in general any SIP-enabled device. In addition to being able to be run in parallel with one or more applications on the set-top box 500, the execution of a specific application, such as a bill management application on the set-top box, could trigger the establishment of a SIP communication and, once active, a corresponding communication on the set-top box could optionally be terminated.

The security module 570 can provide varying levels of security for the information within the profile 400. Furthermore, as previously discussed, a hierarchical security platform can be established with, for example, a master profile that regulates dependent profiles, such as those that would be established by parents for their children.

In general, since any information can be stored in the profile 400, various rules, policies, profiles, and the like can be established that govern not only access to, but dissemination of the information within the profile, such as bill management, e.g., paid bills, to-be paid bills, account information, balance information, credit information, etc. For example, access to the various types of information in the profile can be regulated based on who is trying to access the information, what type of information is attempting to be accessed, what the accessed information is going to be used for, and the like, and can be analyzed by the security module 570 to determine whether that access or dissemination should be allowed. For example, the security module 570 can cooperate with the intelligent agent module (not shown) to assist with analysis of any security risk that may be associated with providing access to the information within the profile 400.

Communications applications module 575 enables various types of communications applications to be used with the set-top box 500. These communications include, for example, audio communications, video communications, chat communications, telephony type communications, or in general any communication between the set-top box, and another entity on the network, or with one or more of the devices associated with and connected to the set-top box, or communications associated with a bound device, such as a bound IP soft phone.

The video link module 585 allows a user to establish a communication link, such as an audio, video, or multi-media communications link, between one or more of an appointment setter, an agent, another entity, and the user. This video link can be used to coordinate schedules, calendar items, resolve conflicts, or in general just provides a richer user interface that is more akin to face-to-face scheduling.

Figure 3:
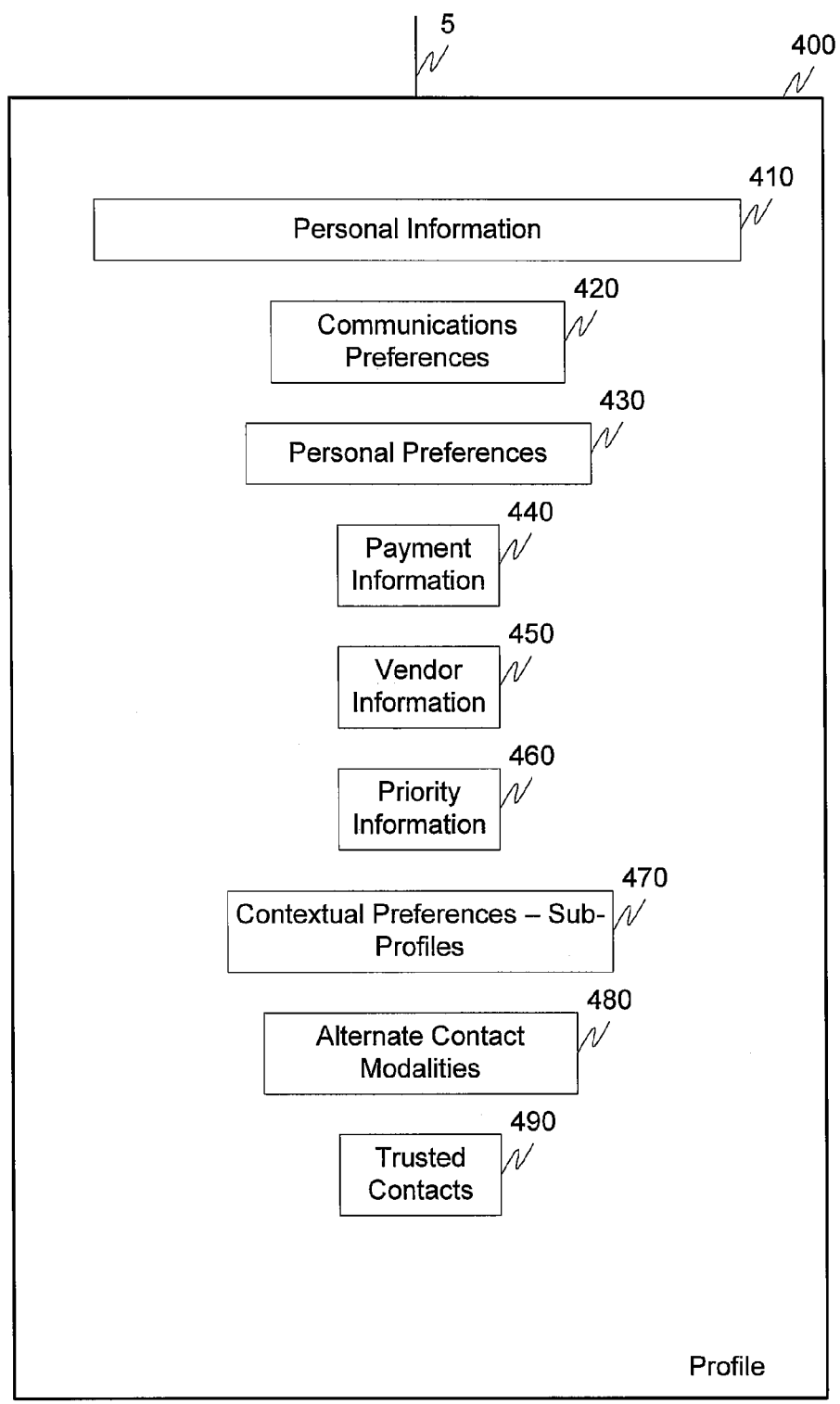
FIG. 3 illustrates an exemplary profile according to this invention.

FIG. 3 outlines an exemplary profile 400. The exemplary profile 400 comprises one or more of personal information 410, communications preferences 420, personal preferences 430, calendar information 440, vendor information 450, priority information 460, contextual preferences and sub-profiles 470, alternate contact modalities 480 and trusted contact information 490.

As discussed, the personal information can include any information that a user would like to store. For example, examples of personal information include name, address, credit card information, communications preferences, restaurant preferences, availability preferences, and the like. The personal information 410 need not be expressly limited however to a single person, but instead can also apply to groups of individuals, one or more entities, or in general any entity that may include one or more persons, businesses, groups, or the like. Interfaces can be provided that allow access to the information stored within the profile, and this information can be edited, updated, deleted, or modified as appropriate. The updating, editing, or deleting of this information can be performed via an interface on the set-top box, or via any interface on a device associated with the set-top box. This access to the information within the profile can be password protected, and the information can be transferred via or in accordance with well-known encryption techniques and standards.

The communications preferences 420 provide the user the ability to store various types of communications preferences or modalities that govern not only the type of communication to access the user, e.g., video, chat, IM, telephone, or the like, but can also be used in conjunction with the presence information and/or communication routing.

The personal preferences 430 are a set of rules related to a particular user's personal preferences. These personal preferences can relate to any functionality of the set-top box, display characteristics of the set-top box, operation of the set-top box, operation of the calendaring functionality, or the like, and can be related to any one or more of menu options, communications preferences, contact preferences, calendaring preferences, set-top box management, or the like.

Vendor information 450 stores various information that can be used for payment of goods and/or services ordered through or in conjunction with the use of the set-top box. This payment information can have a higher security level than other types of information within the profile 400, such that, for example, a password is required before the purchase for goods and services can be made. Additionally, the payment information can be limited to use by the contact/service provider 300.

The vendor information 450 can include such information as preferred vendors, vendors who should not be used, historical purchase or appointment information, invoice information, account information, reference information associated with a particular vendor, or in general any information associated with a vendor. When new vendor is utilized, in conjunction with an intelligent agent module, new information can be added to the vendor information 450 and stored in the profile 400.

For example, a vendor could be a doctor's office. Information relating to not only historical doctor's visits but future appointments can be tracked and association with the vendor information 450 and optionally notes also associated with one or more of these calendar items.

In addition, also in conjunction with an intelligent agent module, the vendor information 450 can be dynamic such that, for example, if a user accesses a particular vendor's website, such as a doctor's office, a patient identifier, or the like can be populated into the vendor information 450 and, for example, if an appointment is scheduled, a historical record of that saved.

Priority information 460 includes any information, such as rules, that can be used to assist with prioritizing certain activities, applications, or in general, any functionality associated with the set-top box 500. This priority information 460 could also be used in conjunction with an intelligent agent to assist with determining prioritization of certain calendared items.

The contextual preferences and sub-profiles 470 establish preferences based on context that could also be categorized as sub-profiles depending on, for example, a particular application being run on the set-top box 500. As with other types of information, the contextual preferences 470 can be used in conjunction with the intelligent agent to provide a dynamic application behavior.

Alternate contact modalities information 480 outlines various contact modalities for a particular user, group of users, or entities. These alternate contact modalities can be used with communication preference information, personal preference information and/or priority information to assist with completion of an incoming communication to an endpoint. For example, based on information in the alternate contact modalities profile, one or more of the binding module and SIP functionality module can be utilized to complete an incoming communication to an endpoint where the user is located.

Trusted contacts 490 include information regarding one or more individuals, entities, or groups, that are trusted. For example, an entity can be trusted if it is approved by one or more of the content/service provider, the user, or one or more of a group of users. Additionally, an entity can be trusted if, for example, the user has had previous interactions with the entity and has identified them as being trusted.

Optionally, an intelligent agent can also be used in conjunction with trusted contacts 490 to analyze communications between the user's set-top box and other individuals or entities and upon, for example, a threshold number of transactions being completed in a satisfactory manner, the entity identified as trusted, with optionally a query being sent to the user for final approval before listing this individual or entity as trusted.

Figure 4:
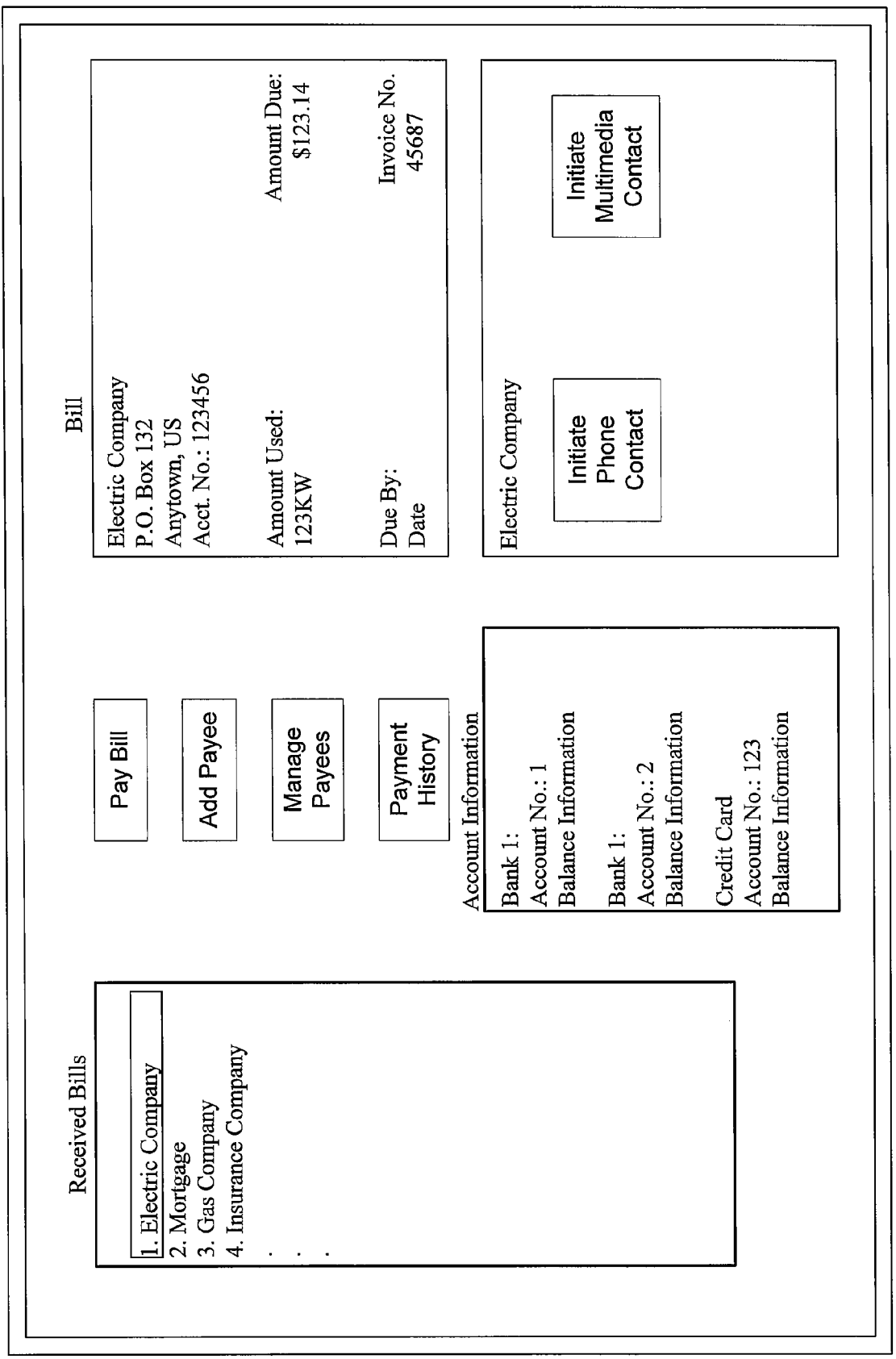
FIG. 4 illustrates an exemplary bill management interface according to this invention.

FIG. 4 illustrates an exemplary graphical user interface 40 that can be displayed in conjunction with the set-top box 500 and one or more of the associated devices, such as TV 900. The interface 40 comprises a received bill portion 410, an account information 420, a bill portion 430, and a contact portion 440.

The received bill portion 410 can include a list of the one or more bills that have been received. In addition, an indicator can be provided that provides the status of the bill, such as new, paid, due on date, or the like. In addition, the received bill portion 410 can appear in the format of a calendar with the bill information shown on the date on which the bill is due.

Upon the selection of a bill, which for this exemplary embodiment, received bill 1 for the "Electric Company" is shown as being selected, the user can then select from the account information portion 420 an account from which the bill is to be paid. Upon selection of the account information, the user can select the bill paid button 450 to commence payment of the bill.

A bill portion 430 can show information about the bill including, for example, invoice number, due date, amount due, vendor, or in general any information associated with the bill.

The contact portion 440 is populated based on the vendor information associated with the received bill and can include buttons to one or more of an initiate a phone contact with the vendor, which in this example is the electric company, or a multi-media contact with the electric company.

The ad payee button 460 allows a user to manage the one or more payees stored on the set-top box and allows them to change, for example, address information, electronic funds transfer routing information, or in general any information associated with one or more vendors. The manage payee button 470, when selected, can take the user to a payee interface that allows a user to one or more of view payees, edit information associated with payees and, when selected, can provide the contact interface, such as the contact portion 440 for that particular payee.

The payment history button 480, when selected, can display payment history information associated with one or more selected payees.

FIG. 5 illustrates an exemplary preference interface 50. In particular, the interface 50 comprises a payee portion 510, a payee preference portion 520 and a notification portion 530 with associated edit and save buttons. The preference interface 50, upon the selection of a payee, provides a summary of information associated with the payee such as preferences for payment and notification. These preferences can be edited by selection of the corresponding edit or save buttons (540, 550, 560 and 570, respectively). In this particular example, the payment preferences for the electric company are that payment is to be made from "Bank 1" using "Account 1" and payment should be made, on the 10th of the month. The notification preferences for the electric company, as illustrated in the notification portion 530, indicate that upon receipt of a bill the payee name and the amount due are sent to a certain phone number, the received bill interface associated with the STB is populated, if the amount is below $200.00 an automatic payment is initiated and, if paid, the status identifier associated with the payee is updated to "paid" when the bill is paid on the 10th.

Figure 6:
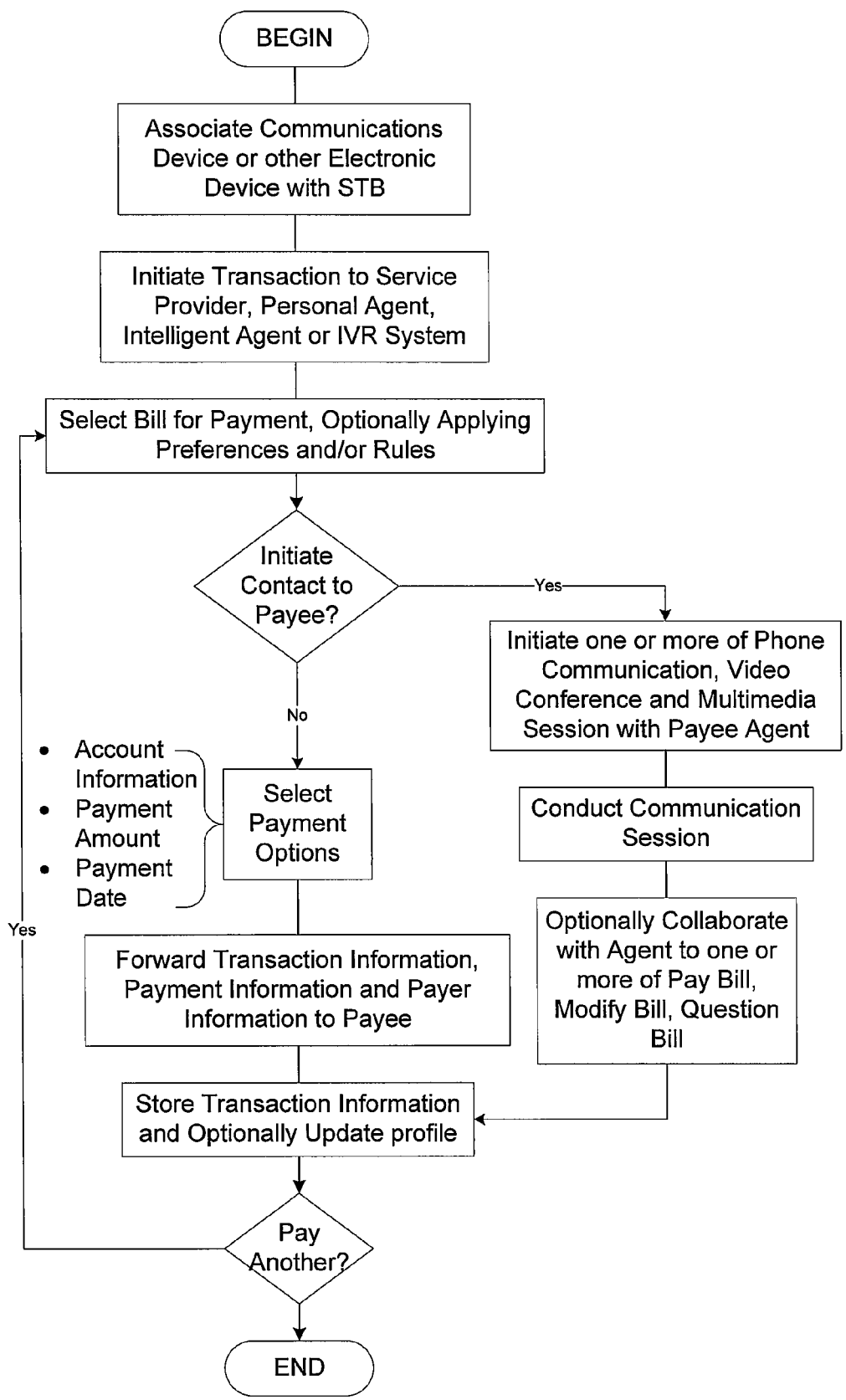
FIG. 6 is a flowchart outlining an exemplary bill notification method according to this invention.

FIG. 6 illustrates an exemplary method of bill management according to this invention. In particular, control begins in step S600 and continues to step S610. In step S610, one or more vendors are associated with the STB thereby allowing bills to be received from that vendor at the STB. Next, in step S620, a determination is made if a bill has been received. If a bill has been received, control continues to step S630 with control otherwise jumping to step S660 where the control sequence ends.

In step S630, an incoming bill can be analyzed, for example, with the cooperation of an intelligent agent. Next, in step S640, and based on the analysis, one or more predetermined actions can be taken based on rules associated with one or more of the profile 400 or vendor information. These predetermined actions include one or more of automatic payment, forwarding invoice information to one or more destinations, ranking an invoice by due date and/or amount, acquiring an image of the bill, displaying payment history, categorizing or filing the bill based on any predetermined criteria, or the like. Should a predetermined action be performed based on the application of one or more rules and preferences, the action is performed with control continuing to step S650 where the check for receipt of one or more new bills is performed. If one or more new bills have been received, control jumps back to step S630 with control otherwise continuing to step S660 where the control sequence ends.

Figure 7:
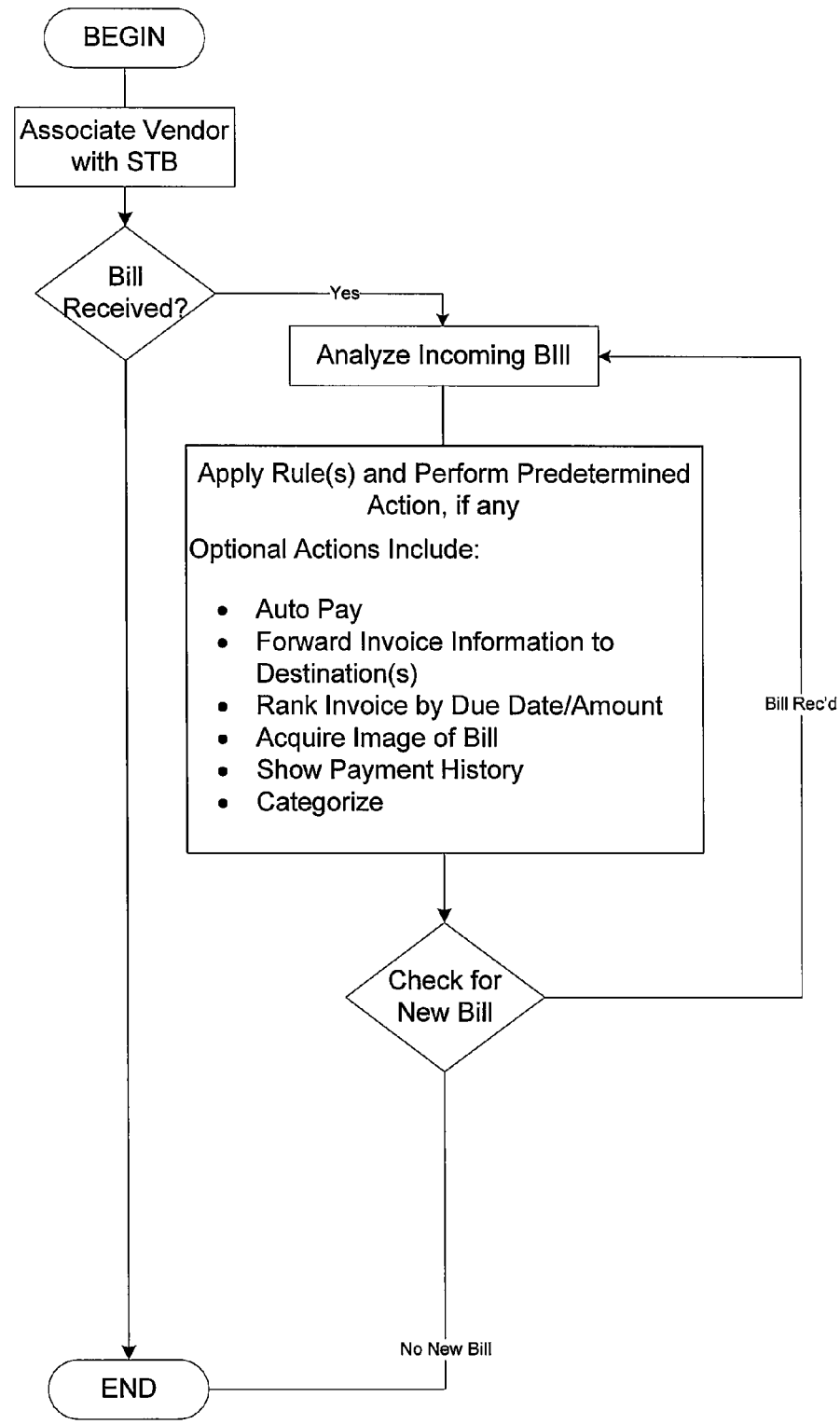
FIG. 7 is a flowchart outlining an exemplary method for bill management according to this invention.

FIG. 7 illustrates an exemplary method for bill management and payment according to this invention. In particular, control begins in step S700 and continues to step S710. In step S710, one or more communications devices or other electronic devices are associated with the STB. As discussed, this allows information to be forwarded and/or an interface provided on the associated device. Next, in step S720, a communication can be initiated to one or more of a service provider, personal agent, intelligent agent, or IVR system based on, for example, the receipt of a notification that a bill should be paid. Then, in step S730, one or more bills are selected for payment with the optional application of preferences and/or rules as discussed previously. Control then continues to step S740.

In step S740, a determination is made whether to initiate contact to a payee. If contact is to be initiated to a payee, control continues to step S750 where one or more of a phone communication, video conference and multi-media session are established with the payee agent. Otherwise, control continues to step S780.

In step S760, the communication session is conducted with control continuing to step S770 where collaboration with an agent to one or more of pay the bill, modify a bill, question a bill, or the like can be commenced. Control then continues to step S792.

In step S780, one or more payment options are selected. These payment options can include account information, payment amount, payment date, or the like. In general, any information associated with management of the payment can be included as a payment option. Next, in step S790, the transaction information, payment information and payor information can be forwarded to the payee. Then, in step S792, the transaction information is stored and optionally the profile updated with the same. Control then continues to step S794 where a determination is made whether another bill is to be paid, in which case control jumps back to step S730, with control otherwise continuing to step S796 where the control sequence ends.

A number of variations and modifications of the invention can be used. It would be possible to provide for some features of the invention without providing others.

The exemplary systems and methods of this invention have been described in relation to STB's and profile(s). However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network 10, such as a LAN, cable network, and/or the Internet, or within a dedicated system. Thus, it should be appreciated, that the components of the system can be combined in to one or more devices, such as a STB, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, in one or more communications devices, at one or more users' premises, or some combination thereof. Similarly, one or more functional portions of the system could be distributed between a communications device(s), such as a STB, and an associated computing device. The one or more functional portions of the system could be also be installed in a TV or TV tuner card, such as those installed in a computer.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® (or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A set-top box with an operating system layer operable to support cable network interconnectability and to provide an application platform comprising:
   one or more profiles stored on the set-top box, each profile including personal information and personal preferences, one or more of the personal information and personal preferences used in association with a bill management application;
   a bill management interface operable to allow management of one or more received bills, the management including initiating a voice or multi-media communication with a vendor's contact center based on an analysis of the one or more received bills, the analysis including one or more of identifying one or more of an amount due, minimum payment information, due date information, account number information and invoice number;
   a communication application operable to receive a request, from a common customer routing center, to retrieve a stored service information entry from the one or more profiles in the set-top box, wherein the request to retrieve the stored service information entry is sent based on a phone number for the voice or multi-media communication, and send the stored service information entry to the common customer routing center, wherein the common customer routing center uses the stored service information entry to forward the voice or multi-media communication to the vendor's contact center; and
   a security module operable to do at least one of: filter, analyze, restrict access to, restrict dissemination of, and control information in the one or more profiles.

2. The set-top box of claim 1, wherein the one or more profiles comprise one or more of personal information, communications preferences, personal preferences, calendar information, vendor information, priority information, contextual preferences, one or more sub-profiles, alternate contact modalities and one or more trusted contacts.

3. The set-top box of claim 1, adapted to receive one or more of television programming, data, voice information, internet communications, VOIP communications, e-commerce communications, communication from attached electronic devices, content, invoices and bills.

4. The set-top box of claim 1, further comprising a menu module, the menu module operable to display one or more menus based on the bill management application.

5. The set-top box of claim 1, wherein the bill management application includes an initiate service transaction request that includes information from the one or more profiles, the initiate service transaction request utilizing internet-based protocols to communicate with one or more of a trusted entity, a content/service provider, an intelligent agent and an IVR system.

6. The set-top box of claim 1, further comprising a module operable to analyze and process one or more received bills based on one or more rules, a result of the analysis being one or more of automatically paying the bill, forwarding information from the bill to one or more destinations, securing an image of the bill, categorizing the bill and calendaring the bill based on a due date.

7. The set-top box of claim 6, wherein one or more additional devices are bound to the set-top box, the additional devices including one or more of a phone, a SIP enabled device, an electronic communication device, a soft phone, a multimedia device, an audio device, a PDA, a video device and an electronic device.

8. The set-top box of claim 1, further comprising one or more sub-profiles, the behavior of which is governed by the one or more profiles.

9. A method of operating a set-top box having an operating system layer operable to support cable network interconnectability and to provide an application platform comprising:
establishing and storing one or more profiles, in the set-top box, each profile including personal information and personal preferences, one or more of the personal information and personal preferences used in association with a bill management application;
securing, by a security module, at least one of: filters, analyzes, restricts access to, restricts dissemination of, and controls information in the one or more profiles;
managing the bill management application, the management including initiating a voice or multi-media communication, with a vendor's contact center based on an analysis of the one or more received bills, the analysis including one or more of identifying one or more of an amount due, minimum payment information, due date information, account number information and invoice number;
receiving, from a common customer routing center, a request to retrieve a stored service information entry from the one or more profiles in the set-top box, wherein the request to retrieve the stored service information entry is sent based on a phone number for the voice or multi-media communication; and
sending the stored service information entry to the common customer routing center, wherein the common customer routing center uses the stored service information entry to forward the voice or multi-media communication to the vendor's contact center.

10. The method of claim 9, wherein the one or more profiles comprise one or more of personal information, communications preferences, personal preferences, bill information, vendor information, priority information, contextual preferences, one or more sub-profiles, alternate contact modalities and one or more trusted contacts.

11. The method of claim 9, further comprising receiving one or more of television programming, data, voice information, internet communications, VOIP communications, ecommerce communications, communication from attached electronic devices, bills, invoices and content.

12. The method of claim 9, further comprising analyzing and processing one or more received bills based on one or more rules, a result of the analysis being one or more of automatically paying the bill, forwarding information from the bill to one or more destinations, securing an image of the bill, categorizing the bill and calendaring the bill based on a due date.

13. The method of claim 9, wherein a calendaring application includes an initiate service transaction request that includes information from the one or more profiles, the initiate service transaction request utilizing internet-based protocols to communicate with one or more of a trusted entity, a content/service provider, an intelligent agent and an IVR system.

14. The method of claim 9, further comprising binding one or more additional devices to the set-top box, wherein the one or more additional devices include a phone, a SIP enabled device, an electronic communication device, a soft phone, a multimedia device, a PDA, an audio device, a video device and a electronic device.

15. The method of claim 9, further comprising establishing one or more sub-profiles, the behavior of which is governed by the one or more profiles.

16. The method of claim 9, further comprising:
comparing the one or more received bills from the vendor to one or more pervious received bills from the vendor;
determining whether a change in the one or more received bills appears to be abnormal; and
in response to determining whether the change in the one or more received bills is abnormal, initiating the voice or multi-media communication with the vendor's contact center.

17. The method of claim 9, further comprising:
determining if the one or more received bills are over a certain amount or due within a certain time period;
in response to determining if the one or more received bills are over the certain amount or due within the certain time period, forwarding, to an associated communications device, the one or more received bills; and
in response to determining if the one or more received bills are not over the certain amount or due within the certain time period letting the one or more bills reside on the set-box.

18. A means for operating a set-top box having an operating system layer operable to support cable network interconnectability and to provide an application platform comprising:
means for establishing one or more profiles, each profile including personal information and personal preferences, one or more of the personal information and personal preferences used in association with a bill management application;
means for doing at least one of: filtering, analyzing, restricting access to, restricting dissemination of, and controlling information in the one or more profiles;
means for managing the bill management application, the management including and initiating a voice or multi-media communication with a vendor's contact center based on an analysis of the one or more received bills, the analysis including one or more of identifying one or more of an amount due, minimum payment information, due date information, account number information and invoice number;
means for receiving a request, from a common customer routing center, to retrieve a stored service information entry from the one or more profiles, wherein the request to retrieve the stored service information entry is sent based on a phone number for the voice or multimedia communication; and
means for sending the stored service information entry to the common customer routing center, wherein the common customer routing center uses the stored service information entry to forward the voice or multi-media communication to the vendor's contact center.

19. The means for operating the set-top box of claim 18 further comprising: means for binding one or more additional devices to the set-top box, wherein the one or more additional devices include a phone, a SIP enabled device, an electronic communication device, a soft phone, a multimedia device, a PDA, an audio device, a video device and a electronic device.

20. The means for operating the set-top box of claim 18 further comprising: one or more sub-profiles, the behavior of which is governed by the one or more profiles.

* * * * *

UNITED STATES PATENT AND TRADEMARK OFFICE
CERTIFICATE OF CORRECTION

PATENT NO. : 9,215,421 B2
APPLICATION NO. : 12/130611
DATED : December 15, 2015
INVENTOR(S) : Theresa Campagna, David L. Chavez and Gregory D. Weber It is certified that error appears in the above-identified patent and that said Letters Patent is hereby corrected as shown below:

In the Claims

At Column 20, line 18, please delete "m ore" and replace it with --more-- therein.

At Column 20, line 25, please delete "set-box" and replace it with --set-top box-- therein.

Signed and Sealed this
Twenty-ninth Day of March, 2016

Michelle K. Lee
*Director of the United States Patent and Trademark Office*